Sept. 8, 1959  A. J. FRYDENLUND  2,903,026
GUIDE MEANS FOR SAWS
Filed Aug. 31, 1956  2 Sheets-Sheet 1
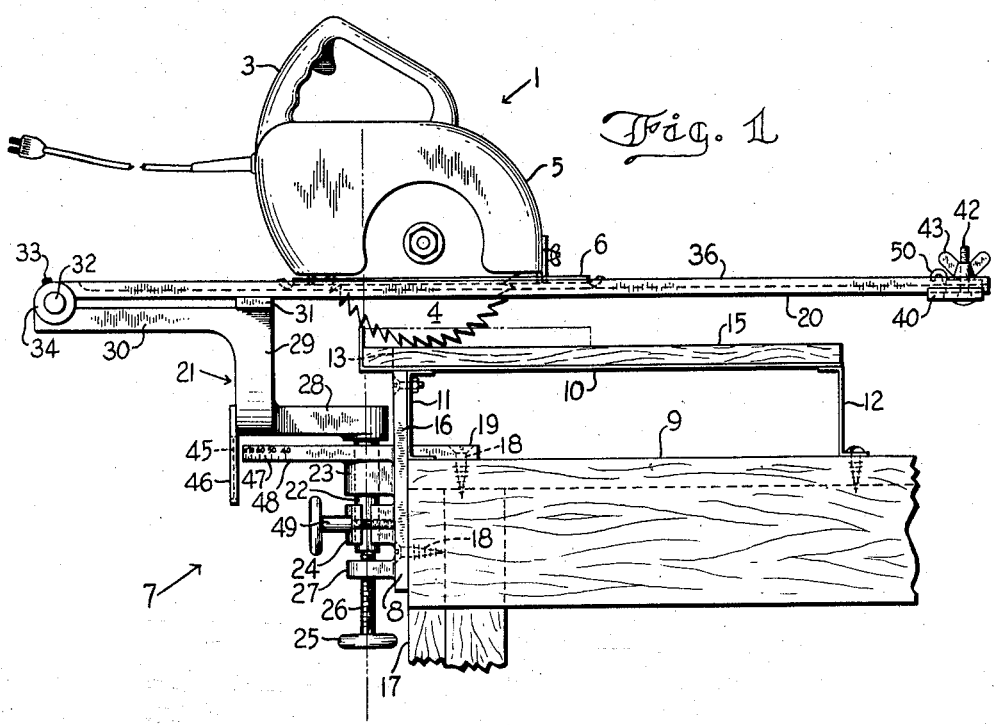
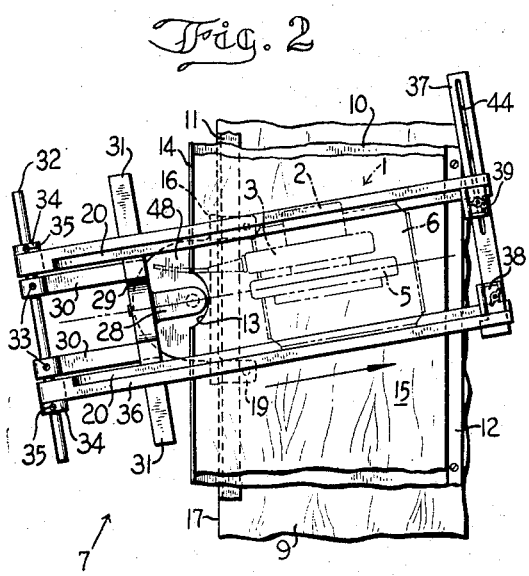
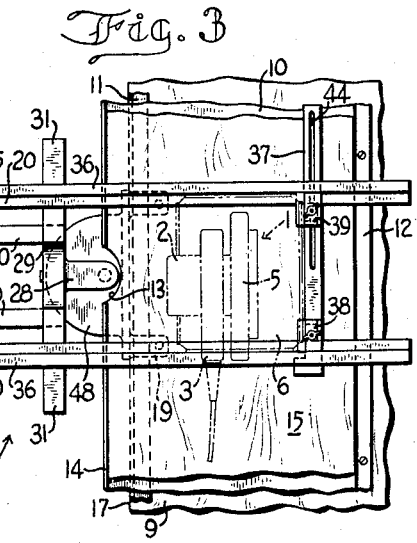
INVENTOR.
ARTHUR J. FRYDENLUND
BY
Andrus & Sceales
Attorneys Sept. 8, 1959  A. J. FRYDENLUND  2,903,026
GUIDE MEANS FOR SAWS
Filed Aug. 31, 1956  2 Sheets-Sheet 2
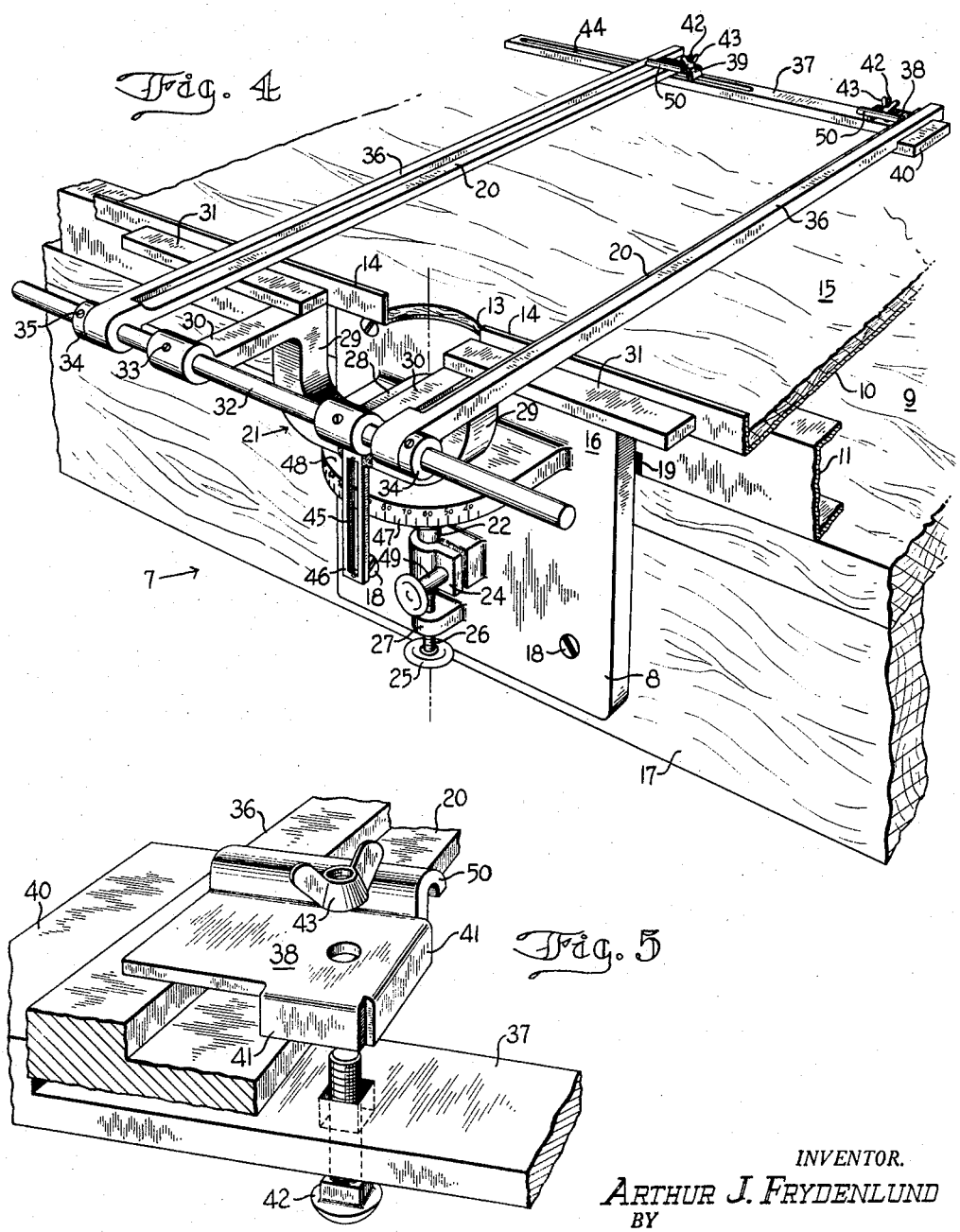
INVENTOR.
ARTHUR J. FRYDENLUND
BY
Andrus & Sceales
Attorneys

United States Patent Office 2,903,026
Patented Sept. 8, 1959

2,903,026

GUIDE MEANS FOR SAWS

Arthur J. Frydenlund, Prairie du Chien, Wis.

Application August 31, 1956, Serial No. 607,429

5 Claims. (Cl. 143—6)

This invention relates to guide means for saws, and more particularly to a miter-guide for portable skillsaws and the like.

The invention contemplates a miter-guide for attachment to a workbench or the like and which supports a portable saw for linear movement in any of a plurality of predetermined directions. The saw may also be accurately poistioned for ripping.

The miter-guide is adapted for pivotal movement about a vertical axis which intersects the edge of the workpiece at which cutting is to begin. When successive miter cuts are to be made on the same workpiece, the angle of the saw blade may be changed without altering the position of the starting point.

The support for the saw is hinged about a rod member, with the latter providing means for sliding adjustment of the support to accommodate saws having different frame dimensions.

The accompanying drawings illustrate the best mode presently contemplated by the inventor for carrying out the invention.

In the drawings:

Figure 1 is a side elevation of the guide frame secured to a bench and carrying a saw for cutting a workpiece which is shown in dotted lines;

Fig. 2 is a plan view of the guide frame and saw in smaller scale and with the bench shown in part;

Fig. 3 is a view similar to Fig. 2 with the guide frame and saw set for ripping a board by moving the board beneath the saw;

Fig. 4 is a perspective view of the guide frame and a part of the bench to which the guide frame is secured; and Fig. 5 is an enlarged perspective view of means for securing the end of a cross-brace to one of the rails and forming a part of the guide frame.

The saw 1 shown in the drawings is of the type having a motor housing 2 on the left side of the handle 3. A circular saw blade 4 operates within a guard 5 and is located near the right edge of a supporting base plate 6 and extends through an opening in the plate a given distance which may be the maximum setting for use with the guide frame 7 of the present invention.

The guide frame 7 which includes the frame base 8 is shown fixed to the bench 9. The sheet metal worktable 10 is raised to provide a convenient height above the usual bench height for the operation of saw 1 and is supported by the braces 11 and 12. The foreward edge of worktable 10 overhangs the front apron of bench 9 and is notched as at 13 and is provided with the upward flanges 14 which provide a workstop or straight edge guide against which the board to be cut is to be firmly held, as will be described. The top of worktable 10 is covered by the planking 15 to protect the saw blade from contact with the sheet metal comprising table 10.

The base of guide frame 7 comprises a vertical plate 16 fixed to the front apron 17 of bench 9 as by a plurality of screws 18, and by rear lugs 19 which are secured to the top of bench 9.

The base plate 6 of saw 1 is supported by and adapted to slide along a pair of rails 20 which carry the saw above worktable 10. Rails 20 are supported by a rigid cast-metal frame 21 having a downwardly extending pintle or pivot shaft 22 which fits in the solid bearing 23 and split bearing 24 of base 8 to provide the pivotal support of the frame on a vertical axis.

Vertical movement of shaft 22 in bearings 23 and 24 is provided by a handle 25 disposed on the lower end of a screw 26 which operates in a bracket 27 fixed to base 8 below the shaft. The upper end of screw 26 engages the lower end of shaft 22 to support the same vertically at the desired height and which may be adjusted by operating handle 25 to turn screw 26 which moves up or down accordingly.

The upper end of shaft 22 carries an arm member 28 which supports a U-shaped frame or yoke member 29 in a vertical position forwardly of bench 9. A pair of spaced parallel horizontal arms 30 extend outwardly from the upper ends of yoke 29 and longitudinally of rails 20. A second pair of horizontal arms 31 extend outwardly from the upper ends of yoke 29 and transversely of rails 20. Arms 30 provide the hinged support of the outer ends of rails 20, while arms 31 provide a rest for support of the rails inwardly of the ends thereof.

The forward end portions of arms 30 and rails 20 are enlarged and provided with horizontal bores to receive a horizontally disposed rod 32 therethrough. Rod 32 provides for pivotal movement of rails 20 with respect to arms 30 as for lifting the rails to allow placement of a long piece of lumber directly on worktable 10.

Rod 32 is adjustably secured against lateral and rotational movement by set screws 33 disposed in the forward bored ends of arm 30. Rails 20 are adjustably slideable on rod 32, with the forward ends of arms 30 providing an inner stop. An outer stop is provided by a collar 34 disposed outwardly of each rail 20 on rod 32. Collars 34 are adjustable along the rod and are tightened thereto by set screws 35.

According to the present invention, the adjustment of rails 20 allows them to be spaced for any of various sizes of saws and particularly so that the base plate 6 of saw 1 fits on the rail and between rail flanges 36 which are provided to guide the saw in a straight line as it slides on the rails.

A parallel spaced relationship of rails 20 is maintained by a laterally extending cross brace 37 having two clips 38 and 39 which hold the brace to the underside of the rails. One end of brace 37 is provided with a forwardly extending flange or shoulder 40 which is perpendicular to the bar and is adapted to engage the side of the flange 36 of one rail. Brace 37 together with shoulder 40 operate as a square for providing and maintaining a parallel relationship between the rails. The clips 38 and 39 are of stamped sheet metal having a flat portion to fit the rail and downwardly extending ears 41 which stand on and engage the brace. A carriage bolt 42 fits a square hole in brace 37 and extends upwardly through a round hole in clip 38 to receive a wing nut 43. Tightening of wing nut 43 holds clip 38 on the respective rail 20 and draws the brace 37 tight against the underside of the rails. Clip 39 similarly secures the other end of the bar to the rail. The bolt 42 securing clip 39 is however slideable in a slot 44 in brace 37 to allow adjustable spacing of the clips for tightening engagement with the rails.

In using the guide frame, the workpiece is placed on worktable 10 by first pivoting rails 20 and saw 1 out of the way.

The workpiece is positioned with the edge at which cutting is to begin held firmly against workstop 14. The point along the edge where the cut is to begin is positioned above the shaft 22 and substantially on the axis thereof.

In practice, rails 20 are positioned on rod 32 so that the saw blade 4 will pass through the axis of shaft 22 when the saw is moved into position for cutting. The selection of the miter angle may be made thereafter without repositioning the piece to be cut.

The miter angle is indicated by a wire 45 carried vertically by a rectangular slotted frame 46 and disposed in front of the graduated face 47 of a curved plate 48 which, as shown, forms a part of base 8. Face 47 is graduated in degrees so that the angular adjustment of rails 20 with respect to workstop 14 and the workpiece is indicated by the position of wire 45.

Vertical shifting of rails 20 to provide the desired depth of cut of saw 1 is accomplished by turning handle 25 which turns screw 26 to raise or lower the rails as previously described. If desired, the depth of cut may be indicated by a suitable scale, not shown, which may be marked on slotted frame 46 or on the shaft 22.

When the depth of cut adjustment has been completed, shaft 22 is firmly secured by turning the handle of a clamp screw 49 which tightens split bearing 24 and prevents any further movement of the shaft 22, or of rails 20. The cut is then made by grasping handle 3 of saw 1 and pushing the saw along rails 20 away from the operator until the cut is completed.

Where long pieces of lumber are to be ripped, the saw 1 may be set at right angles on the rail, as shown in Fig. 3. Since the base plate 6 may not be perfectly rectangular, the adjustment of either or both rails 20 on rod 32 may be necessary. During the ripping, the saw is held laterally in place on the rails by the rolled edges 50 of clips 38 and 39 which fit over and engage the turned-up edges of the base plate 6 of the saw.

Brace 37 is relocated along rails 20 so that the saw blade 4 is spaced from workstop 14 of table 10 according to the desired width of the finished board.

Rod 32 and the rigid frame including shaft 22 and arms 30 and 31 provide the rigidity required for supporting the rails in a plane parallel to table 10. The arms 31 do not interfere with miter cuts and allow the rails to be adjusted on rod 32 while maintaining the rails at the same height above table 10 so that such adjustment does not affect the preselected depth of cut.

The rails 20 may be pivoted horizontally about the axis of shaft 22 to provide an infinite selection of miter angles within the range dictated by the size of notch 13 and the spacing of the two flange portions of workstop 14.

Rod 32 serves not only as a hinge for raising of rails 20, but also as an end support for the rails which may be adjustably moved therealong. The minimum spacing of rails 20 is dictated by the enlarged end portion of arm 30 which provides the support of rod 32. The maximum spacing of rails 20 is dictated by the length of the rod and by the adjustable collars 34. When a saw is supported by the rails, the saw base 6 prevents inward movement of the rails while collars 34 prevent outward movement thereof.

The flanged brace member 37 provides an L-shaped square which secures the rearward end portions of rails 20 so that the rails are in exact parallel relationship, facilitating sliding of the saw therealong during miter cuts. When the saw is positioned for ripping, the brace 37 not only keeps the rails parallel, but tightens the saw to the rails to prevent sliding and assures that the saw blade is disposed laterally of the rails and parallel to workstop 14.

The saw 1 and rails 20 are kept horizontal and prevented from downward pivoting by arms 31. When the miter-guide is pivoted about the axis of shaft 22, rails 20 do not slide over the workpiece or any other member, thereby preventing any binding or twisting action, and assuring undisturbed placement of the workpiece. Arms 31 pivot together with rails 20.

In practice, the operator can stand adjacent that portion of the miter-guide which extends outwardly from the bench. The operator can adjust the angles and depth of cut, as well as make the actual cut, without having to move around the bench.

By placing shaft 22 so that the axis thereof intersects the edge of the workpiece, and by disposing rails 20 so that the saw blade 4 can pass through the axis, the starting point for miter cuts of different angles on any given fixed workpiece will always be the same. No shifting of the saw or workpiece is necessary, and successive miter cuts will always bear the desired angular relationship, one with another.

Various modes of carrying out the invention are contemplated as being within the scope of the following claims particularly pointing out and distinctly claiming the subject matter which is regarded as the invention.

I claim:

1. A miter guide for a power saw with said saw having a base and a saw blade extending downwardly through said base for cutting a workpiece, said guide being secured to a workbench or the like and comprising, a vertical shaft, a yoke connected to said shaft and adapted for horizontal pivotal movement about the axis thereof, a first pair of arms extending from said yoke and supporting a laterally extending rod, a pair of spaced rails pivoted on said rod and adjustable thereon for supporting saw bases of varying demensions for sliding movement thereon, a second pair of arms extending from said yoke and adapted to support said rails in a normally horizontal position spaced above the workpiece, a workstop supported on said workbench and disposed in a vertical plane passing through said shaft so that the axis of the shaft intersects the edge of the workpiece, and a cross brace extending between said rails and having means thereon for securing the brace transversely to the rails and for securing the saw base to the rails so that the saw blade is disposed transversely of the rails for ripping of a workpiece.

2. A guide for a portable power saw with said saw having a supporting base and a circular saw blade extending downwardly through said base, said guide having a frame portion supported by a workbench and with the guide comprising a pair of parallel, horizontal rails, a bar and a cross member respectively joining the corresponding opposite ends of said rails to space the rails for the support of the saw with the base slidably disposed on said rails, said rails being movable with respect to the bar and cross member and with respect to each other for different spacing as for saws having bases of different dimensions, means selectively securing said rails and said cross member to form a rigid frame, a vertical shaft supported on said frame portion, a yoke connected to said shaft and pivotable horizontally about the shaft axis, a first pair of arms extending from said yoke and supporting said bar, a second pair of arms extending from said yoke and supporting said rails in a normally horizontal position spaced above a workpiece disposed on the workbench, and a workstop supported on said workbench beneath said rails and disposed in a vertical plane passing through said shaft so that the axis of the shaft intersects the starting edge of the workpiece.

3. The apparatus of claim 2 which includes means on said frame for selectively raising and lowering said vertical shaft to thereby move said rails vertically relative to said workbench.

4. A miter guide for a power saw with said saw having a base and a saw blade extending downwardly through said base for cutting a workpiece, said guide being secured to a workbench or the like and comprising, a pair of spaced rails pivotable vertically on a rod disposed adjacent one end thereof and with said rails supporting said base for sliding movement during mitering, a vertical shaft, a yoke connected to said shaft and horizontally pivotable therewith about the axis thereof, a workstop supported on said workbench and disposed in a vertical plane passing through said shaft so that the axis of the shaft intersects the starting edge of the workpiece, a first pair of arms extending from said yoke and pivotable therewith and supporting said rod, a second pair of arms extending from yoke and pivotal therewith and positively supporting said rails in a horizontal plane spaced above said workstop a distance sufficient to prevent engagement of said workstop by said rails during horizontal pivoting, a cross brace extending between the rails and having means thereon to provide an extent of the brace transverse to the length of the rails and means connected to said brace to tighten the brace to the rails, said last-named means including means to tighten the saw base to the rails in a position so that the saw blade is disposed transversely of the rails for ripping of a workpiece.

5. The apparatus of claim 4 in which the said last named means comprises, a pair of tightenable clips disposed adjacent each rail with each clip having a flat portion to engage the rail and having downwardly extending ears for engagement with the brace, each of said clips also having rolled edge adapted to engage the saw base to hold the base so that the saw blade is disposed transversely of the rails.

References Cited in the file of this patent

UNITED STATES PATENTS

| | | |
|---|---|---|
| 17,151 | Hubbard | Apr. 28, 1857 |
| 1,646,589 | Meek et al. | Oct. 25, 1927 |
| 1,846,641 | Hedgepeth | Feb. 23, 1932 |
| 1,855,945 | Denyer | Apr. 26, 1932 |
| 2,596,524 | Bridwell | May 13, 1952 |
| 2,598,979 | Denney | June 3, 1952 |
| 2,739,624 | Haddock | Mar. 27, 1956 |
| 2,765,820 | Perkins | Oct. 9, 1956 |